United States Patent
Maeda

(10) Patent No.: US 6,751,173 B1
(45) Date of Patent: Jun. 15, 2004

(54) OPTICAL DISK AND OPTICAL DISK APPARATUS

(75) Inventor: Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/560,613

(22) Filed: Apr. 26, 2000

(30) Foreign Application Priority Data

Apr. 28, 1999 (JP) .......................................... 11-121106

(51) Int. Cl.[7] ................................................. G11B 7/00
(52) U.S. Cl. ............................... 369/47.31; 369/44.13; 369/53.41; 369/275.1
(58) Field of Search ............................. 369/47.1, 47.15, 369/47.16, 47.28, 47.27, 47.31, 47.34, 47.47, 53.1, 53.41, 53.44, 59.1, 59.16, 44.13, 275.1, 275.3, 275.4

(56) References Cited

U.S. PATENT DOCUMENTS

| 5,404,345 | A | * | 4/1995 | Taki | .................... 369/275.3 X |
| 6,339,576 | B2 | * | 1/2002 | Maeda et al. | ........ 369/275.4 X |

FOREIGN PATENT DOCUMENTS

| EP | 0 886 266 A2 | 12/1998 | ........... G11B/7/007 |
| EP | 0 986 051 A1 | 3/2000 | ............ G11B/7/00 |
| JP | 11-16216 | 1/1999 | |

OTHER PUBLICATIONS

"Advanced Storage—Magneto Optical Disk, Part 1—Physical Specifications—", Version 1.0, Apr., 1998. pp. 38–45, 47, 53, 54.

* cited by examiner

*Primary Examiner*—Muhammad Edun
(74) *Attorney, Agent, or Firm*—Edward S & Angell, LLP; J. Mark Konieczny; David G. Conlin

(57) ABSTRACT

In order to provide an optical disk of a small radius suitably used in recording/reproducing data at a high density and an optical disk apparatus capable of according/reproducing information into/from such an optical disk, the optical disk of the present invention uses both the grooves and lands as recording tracks. each recording track is divided into a plurality of sectors each including an address segments ASG 0 and ASG 1, and data segments DSG 0–DSG 52. The address segment 0 (ASG 0) and address segment 1 (ASG 1) respectively have wobbled areas in the opposite side walls, by which the address information is recorded. The data segments are non-wobbled DC grooves. Further, each segment is provided with a clock mark.

13 Claims, 11 Drawing Sheets

FIG. 5

[ZONE 1]

(37 SECTORS PER TRACK)

| | ADDRESS SEGMENT 0 | | | | ADDRESS SEGMENT 1 | | | |
|---|---|---|---|---|---|---|---|---|
| | ASN | ZA | SA | | ASN | ZA | SA | |
| GROOVE (n) | 0 | 1 | 100 | | 1 | 1 | 100 | |
| LAND (n) | 0 | 1 | 100 | | 1 | 1 | 137 | |
| GROOVE (n+1) | 0 | 1 | 137 | | 1 | 1 | 137 | |
| LAND (n+1) | 0 | 1 | 137 | | 1 | 1 | 174 | |
| GROOVE (n+2) | 0 | 1 | 174 | | 1 | 1 | 174 | |
| LAND (n+2) | 0 | 1 | 174 | | 1 | 1 | 211 | |

FIG. 6

| ZONE # | START POSITION ALONG RADIUS (mm) | THE NUMBER OF TRACKS | THE NUMBER OF SEGMENTS | THE NUMBER OF SECTORS | A TOTAL NUMBER OF SECTORS | USER CAPACITY (MB) | BIT LENGTH (μm) | THE NUMBER OF ROTATIONS (rpm) | LINEAR VELOCITY (m/s) | USER BIT RATE (Mbps) |
|---|---|---|---|---|---|---|---|---|---|---|
| 1 | 23.273 | 704 | 2035 | 37 | 26048 | 50.95 | 0.1767 | 1179.4 | 2.827 | 11.916 |
| 2 | 22.866 | 1120 | 1980 | 36 | 40320 | 80.28 | 0.1767 | 1212.1 | 2.827 | 11.916 |
| 3 | 22.270 | 1120 | 1925 | 35 | 39200 | 78.05 | 0.1767 | 1246.8 | 2.827 | 11.916 |
| 4 | 21.654 | 1120 | 1870 | 34 | 38080 | 75.83 | 0.1767 | 1283.4 | 2.828 | 11.916 |
| 5 | 21.038 | 1120 | 1815 | 33 | 36960 | 73.60 | 0.1768 | 1322.3 | 2.828 | 11.916 |
| 6 | 20.422 | 1120 | 1760 | 32 | 35840 | 71.37 | 0.1768 | 1363.6 | 2.828 | 11.916 |
| 7 | 19.806 | 1120 | 1705 | 31 | 34720 | 69.11 | 0.1768 | 1407.6 | 2.829 | 11.916 |
| 8 | 19.190 | 1120 | 1650 | 30 | 33600 | 66.88 | 0.1768 | 1454.5 | 2.829 | 11.916 |
| 9 | 18.574 | 1120 | 1595 | 29 | 32480 | 64.65 | 0.1769 | 1504.7 | 2.830 | 11.916 |
| 10 | 17.958 | 1120 | 1540 | 28 | 31360 | 62.42 | 0.1769 | 1558.4 | 2.830 | 11.916 |
| 11 | 17.342 | 1120 | 1485 | 27 | 30240 | 60.19 | 0.1769 | 1616.2 | 2.831 | 11.916 |
| 12 | 16.726 | 1120 | 1430 | 26 | 29120 | 57.97 | 0.1770 | 1678.3 | 2.831 | 11.916 |
| 13 | 16.110 | 1120 | 1375 | 25 | 28000 | 55.74 | 0.1770 | 1745.5 | 2.832 | 11.916 |
| 14 | 15.494 | 1120 | 1320 | 24 | 26880 | 53.54 | 0.1771 | 1818.2 | 2.833 | 11.916 |
| 15 | 14.878 | 1120 | 1265 | 23 | 25760 | 51.28 | 0.1771 | 1897.2 | 2.834 | 11.916 |
| 16 | 14.262 | 1120 | 1210 | 22 | 24640 | 49.05 | 0.1772 | 1983.5 | 2.834 | 11.916 |
| 17 | 13.646 | 1120 | 1155 | 21 | 23520 | 46.83 | 0.1772 | 2077.9 | 2.835 | 11.916 |
| 18 | 13.030 | 1120 | 1100 | 20 | 22400 | 44.60 | 0.1773 | 2181.8 | 2.836 | 11.916 |
| 19 | 12.414 | 800 | 1045 | 19 | 15200 | 29.59 | 0.1800 | 2296.7 | 2.880 | 11.916 |

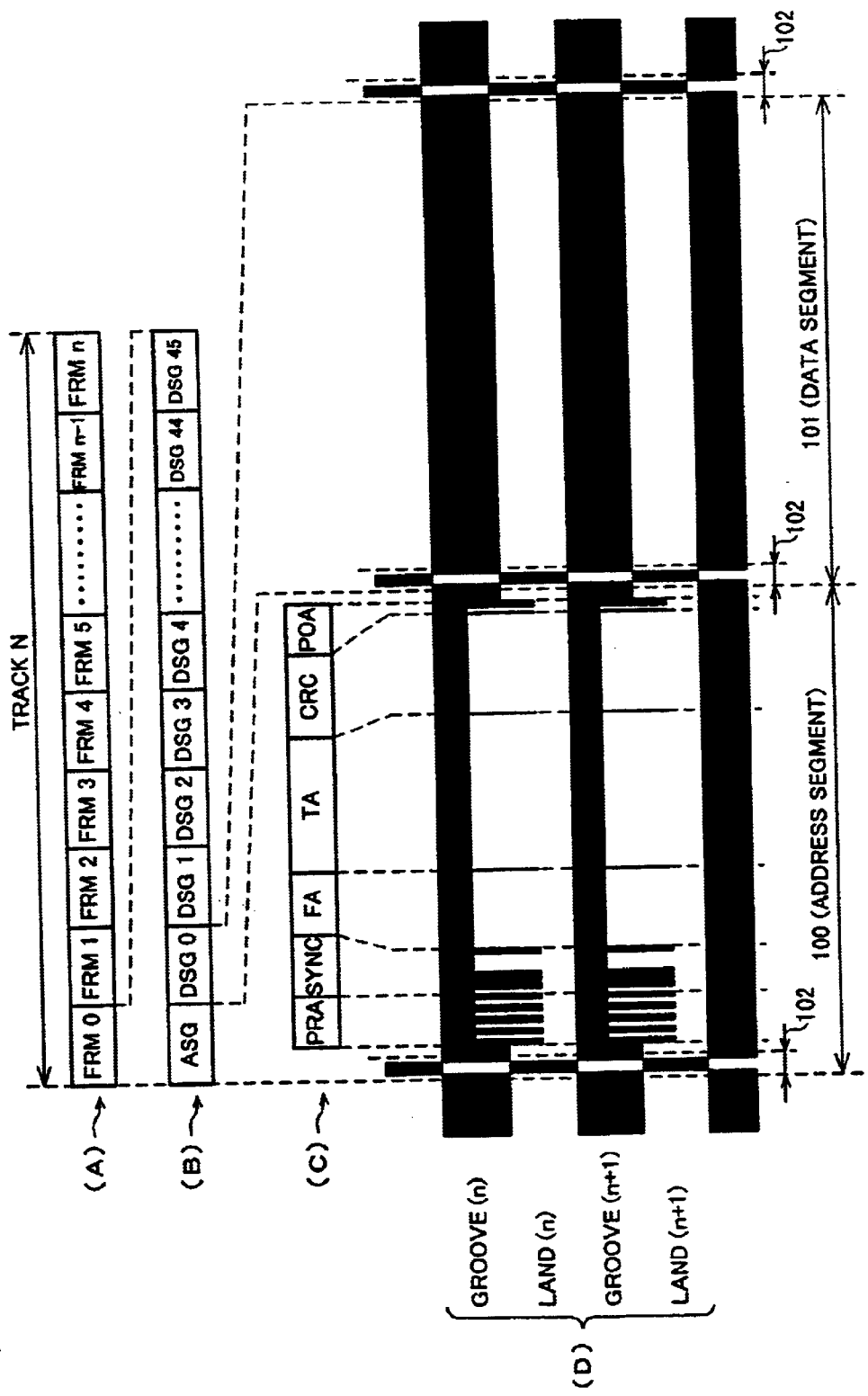

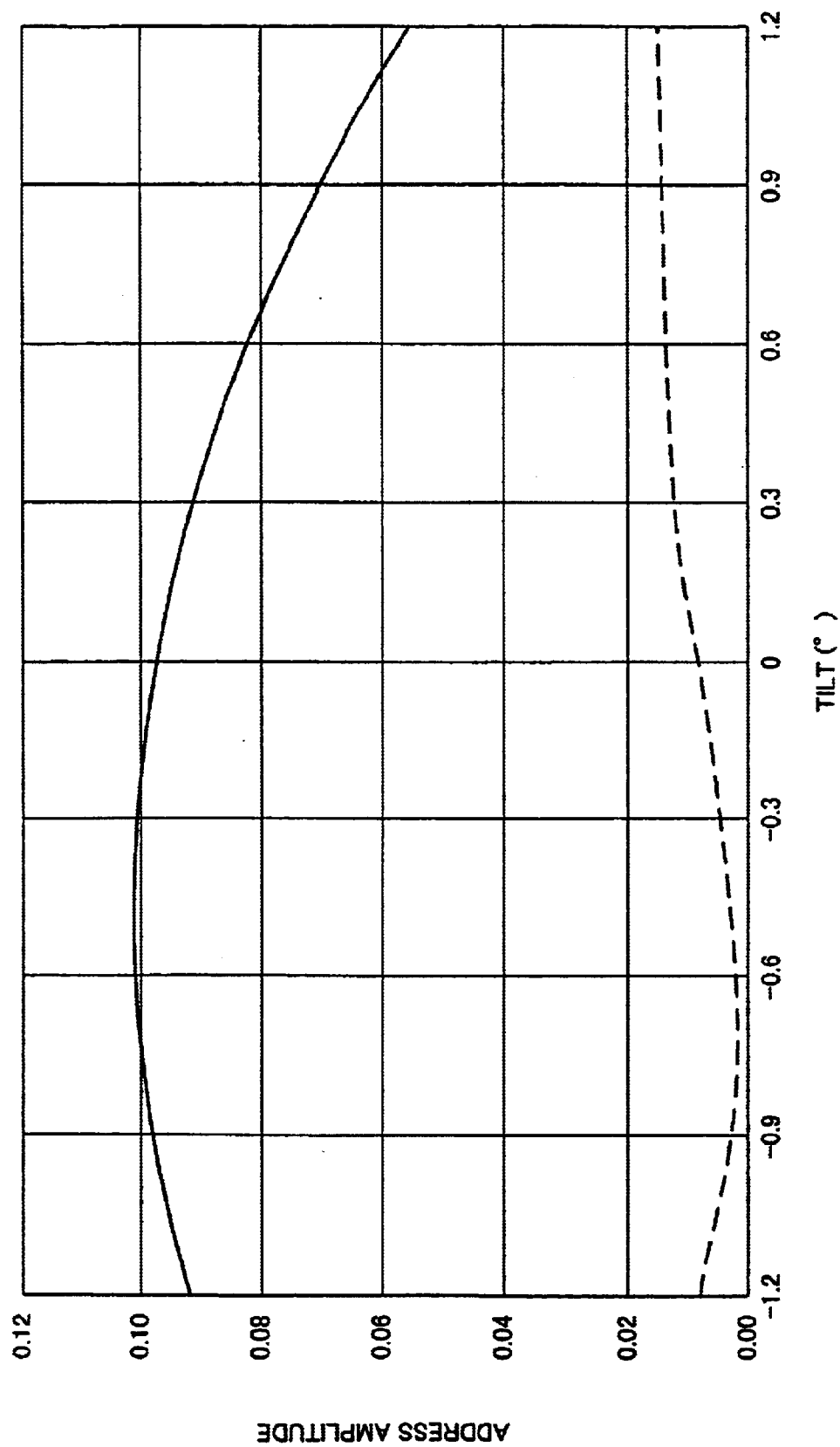

OPTICAL DISK AND OPTICAL DISK APPARATUS

FIELD OF THE INVENTION

The present invention relates to an optical disk having lands and grooves both used as data recording tracks and an optical disk apparatus for recording/reproducing information into/from such an optical disk.

BACKGROUND OF THE INVENTION optical disks, such as magneto-optical disks and phase-change disks, have been known. More precisely, ROM (Read Only Memory) disks used exclusively for reading out data, WORM (write-once, read-many-times) disks, RAM (Random Access Memory) disks used for recording and reproducing data, and so-called partial ROM disks having both a ROM area and a RAM area have been known. The diameters of these disks are: 130 mm and 90 mm for MOs (Magneto Opticals) used in computers; 120 mm and 80 mm for CDs (Compact Discs) and DVDs (Digital Versatile Discs); and 64 mm for MDs (Mini Discs). These optical disks were originally arranged in such a manner that data is recorded into either lands or grooves which are preformed on the disks. However, to meet an increasing volume of recording data in recent years, a so-called land and groove recording technique has been proposed, by which data is recorded in both the lands and grooves. In order to increase a recording density by the land and groove recording technique, a highly reliable clock mark is necessary, so that a clock can be reproduced without depending on the quality of the recording data. Also, as to the structure of the sectors formed on the disk serving as the minimum recording units, such that sector address information can be obtained from the lands and grooves separately has to be given.

Accordingly, Japanese Laid-open Patent Application No. 16216/1999 (Japanese Official Gazette, Tokukaihei No. 11-16216, publishing date: Jan. 22, 1999) discloses a segment structure such that provides 1̂ a high-quality clock mark in the land and groove recording technique, and 2̂ a one-side wobbling address such that realizes sharing of address information by the lands and grooves.

FIG. 10 is a schematic view showing a disk format proposed by the technique disclosed in the foregoing publication. As shown by (A) in FIG. 10, a one-round track used in recording/reproducing data is composed of a plurality of frames denoted as (FRM 0) to (FRM n). As shown by (B) in FIG. 10, each frame is composed of an address segment (ASG) and a total of 46 data segments (DSG 0) to (DSG 45). As shown by (C) in FIG. 10, the address segment (ASG) is composed of: a preamble (PRA) used for clock phase adjustment when reproducing address; a synchronous signal (SYNC) indicating the start of address information; a frame address (FA) as address information in the disk's tangential line direction (i.e., a direction along which the recording track extends); a track address (TA) as address information in the radius direction of the disk; an error detecting code (CRC: Cyclic Redundancy Check Code) used for detecting an error in reproduced address information; and a postamble (POA).

Shown by (D) in FIG. 10 is a land/groove format on the disk. More precisely, in an address segment 100, each of grooves (n) and (n+1) is wobbled at their respective walls at one side to record the address information shown by (C) in FIG. 10. An address used in this one-side wobbling address represents address information shared by a particular groove and a land adjacent to this particular groove. In other words, a pair of the groove (n) and a land (n) adjacent to the same shares the address information, and so does a pair of the groove (n+1) and a land (n+1) adjacent to the same. Thus, a single address segment can be used as a common address area for the land and groove. This offers a significant effect that redundancy caused when assembling address information can be reduced. The foregoing address information can be detected by a radial push-pull signal.

On the other hand, a data segment 101 is composed of so-called straight grooves and lands each sandwiched by non-wobbled two walls.

With any of the foregoing optical disks, the data area and address area are spaced apart from each other so as to prevent interference between these areas, thereby making it possible to reproduce high-quality signals.

A clock mark 102 is appended at the head of each of the address segment 100 and data segment 101. The clock marks 102 are convex marks on the grooves and concave marks on the lands, and aligned along the disk's tangential line direction at regular intervals and radially in the radius direction of the disk (that is, along the radius direction of the disk). By this arrangement, the clock marks can be detected with a tangential push-pull signal from both the lands and grooves. Consequently, a clock can be generated in a stable manner without being affected adversely by a tracking offset or a tilt in the radius direction of the disk. A clock generated from this clock mark responds to an error in the number of rotations of the disk and a change in linear velocity caused by decentering. Thus, if this clock is used as a reference clock when recording/reproducing data, data can be recorded/reproduced into/from the disk at an absolute position with high accuracy.

The foregoing one-side wall wobbling address of the optical disk offers an effect that the address information can be shared by the lands and grooves, but it also has a problem that the quality of an address signal is deteriorated by a tilt in the radius direction of the disk, namely, a radial tilt.

FIG. 11 is a graph showing a change in an address signal amplitude (radial push-pull signal) versus a quantity of the radial tilt. In the graph, a solid line represents a rated amplitude of the address signal, and a broken line represents a quantity of crosstalk between the address signal and an adjacent track. The amplitude of the address signal reaches its maximum when the radial tilt position shifts to the minus side from the center of the radial tilt (0° tilt), and the amplitude of the address signal keeps decreasing as the radial tilt position shifts to the plus side. On the other hand, the crosstalk between the address signal and the adjacent track keeps increasing as the radial tilt position shifts to the plus side. Hence, the plus side of the radial tilt becomes weak in this case (that is, the quality of the address signal is deteriorated markedly). Also, the radial tilt polarity that deteriorates the quality of the address signal reverses when the wobbling on the groove wall is switched from the inner side to the outer side of the disk and vice versa, and between the grooves and lands. In order to eliminate this inconvenience, an ASMO format (Advanced Storage—Magneto Optical Disk, April, 1998) adopts a technique, by which the one-side wobbling address for one address segment is divided by two (first address portion and second address portion). To be more specific, according to the above technique, the first address portion is provided as the one-side wobble at the inner side of the disk, and the second address portion is provided as the one-side wobble at the outer side of the disk, so that a larger radial tilt margin will be given.

The optical disks are advantageous over conventional tapes of recording media in that (1) an access time is far shorter and (2) a large volume of data can be recorded/reproduced without physical contact to the recording media. Thus, while the optical disks are used as an install type external storage device for a personal computer, expectations are also rising that the optical disks can realize an apparatus for recording/reproducing digital motion images of a larger volume or a compact portable device.

However, applying the land and groove recording technique which can realize a large volume recording to a disk having a small diameter causes the following problems.

That is, the foregoing disk format is suitable to a 120-mm disk, and a recording/reproducing area extends from 24 mm to 58 mm along the radius of the disk as does in the DVD, and approximately 1200 segments (clock marks) are provided for each rotation of the disk (per track) in the inner side of the disk. This number is set based on the fact that approximately 1000 clock marks are necessary for each track to have a recording/reproducing clock respond to a change in linear velocity caused by a decentering component in the disk. This is one of the factors used when determining the segment size in the conventional method. Thus, if the disk format is applied directly to a small 50 mm-disk, the recording/reproducing area ranges from 12 mm to 23 mm along the radius of the disk. Therefore, the number of clocks per track in the inner side of the disk is reduced to half, approximately 600, and there arises a problem that the clock can not respond satisfactorily to a change in linear velocity caused by the decentering of the disk. This problem can be solved by increasing the number of clocks per track, that is, reducing the segment size. However, a too small segment size limits a volume of address information placed within the segment.

Further, in a style implemented by the foregoing ASMO format to secure the quality of the address information signal against a radial tilt, that is, in a style where an address for one segment is divided by two (first address information (information at the first address portion) and second address information (information at the second address portion)) to give different one-side wobble directions, if the clock mark at the head of the address segment is broken by a defect or a flaw of the disk, a clock is not generated normally when reproducing the address information, and there is a case that this broken clock makes it impossible to reproduce the first address information and the second address information normally.

In addition, in order to give a constant recording density across the disk regardless of a position along the radius direction, the conventional optical disk adopts the ZCAV (Zoned Constant Angler Velocity) method, by which the disk is divided into a plurality of zones along the radius direction of the disk, and the segments and frames are aligned radially along the radius direction of the disk in each zone, so that the number of frames per track is increased from the inner zones to the outer zones. The address information used in this method is composed of, as shown by (C) in FIG. 10, a track address (TA) that increments for each track (one rotation of the disk) and a frame address (FA) that increments within the track. Thus, if a disk recording/reproducing apparatus is to identify a zone, the reproduced track address information have to be converted (translated) adequately.

Further, when the disk recording/reproducing apparatus fails to reproduce the address information due to a defect of the disk or the like, the disk recording/reproducing apparatus carries out interpolation of address values based on the address information reproduced previously. In case that the address information is in different formats for the track address and frame address, because the number of frames per track differs in each zone, the address interpolation has to be carried out differently in each zone, thereby making the entire process complex. Thus, in this case, there arises a problem that the processing time is extended undesirably and an expensive processing circuit has to be provided.

Also, the disk recording/reproducing apparatus carries out slipping to handle a defective sector on the disk. More precisely, the entire surface of the disk is recorded/reproduced in advance, and a list of addresses of sectors causing a data error is registered on the disk as error management information, so that the defective sectors included in the error management information are skipped when data is actually recorded/reproduced. In this case, in order to skip the defective sectors, the disk recording/reproducing apparatus has to convert an address value of a particular sector into an address value on the disk from which the defective sectors are removed. However, if the address information is in different formats for the track address and frame address, because the number of frames per track differs in each zone, the address conversion involves complicated processing. Consequently, there arises a problem that the processing time is extended undesirably, and an expensive circuit has to be provided.

Further, in order to realize a portable movie, that is, a super-compact disk camera, a disk apparatus has to attain a high data processing rate in order to record/reproduce digital motion pictures, but at the same time it has to be a small-power-consuming compact device. Furthermore, it is preferable that a rising time since a disk is inserted into the disk apparatus is short, that is, it is preferable that the disk apparatus can start recording shortly after the disk was inserted.

SUMMARY OF THE INVENTION

The present invention is devised to solve the above problems, and therefore, has an object to provide an optical disk (especially the one having a small radius) suitably used in recording data at a high density, and an optical disk apparatus for recording/reproducing information into/from such an optical disk.

In order to fulfill the above and other objects, an optical disk of the present invention having concentrical or spiral lands and grooves both used as recording tracks each divided into sectors used as units in writing/reading out data is arranged in such a manner that each of the sectors provided in each of the recording tracks includes:

a first address area for recording address information at one of two walls at boundaries between each recording track and adjacent recording tracks alone by means of wobbling;

a second address area for recording the address information at the other wall on a non-wobbled side in the first address area alone by means of wobbling;

a data area sandwiched by non-wobbled portions of the two walls; and a plurality of clock areas provided discretely along a tangential line direction of the recording tracks, each sandwiched by two areas at a head and a bottom, respectively, each and said two area having different light reflection, wherein:

each sector is divided into a plurality of segments along the tangential line direction;

the first address area is placed in a first segment at a head of each sector;

the second address area is placed in a second segment adjacent to the first segment; and the plurality of clock areas are placed in the plurality of segments, respectively.

According to the above arrangement, deterioration of a data reproducing signal caused by a change in light quantity or disturbance of the light deflected direction can be prevented, thereby improving an S/N ratio. Also, with this optical disk, the wobbles do not have to be provided throughout the recording tracks, and therefore, the disk can be readily manufactured. In addition, because a clock can be reproduced in a stable manner independently of the data, the recording density can be increased. Further, with this optical disk, because a clock can be reproduced independently of tracking, the recording density can be increased.

Also, with this optical disk, a clock can be reproduced from a short mark. Thus, not only can the recording density be increased by reducing redundancy of the data (herein, clock mark), but also the address information can be reproduced in a reliable manner even if the quality of the address information signal is deteriorated by a radial tilt. Further, because the first and second address segments are separated from each other, even if the clock mark in the first address segment is broken by a defect or a flaw of the disk and a clock is not reproduced normally from the broken clock mark when reproducing address, propagation of the adverse effect of the broken clock can be limited, thereby offering an effect that the address can be reproduced in a more reliable manner.

Also, in order to fulfill the above and other objects, an optical disk apparatus of the present invention for recording/reproducing data into/from the foregoing optical disk is arranged to be furnished with:

a laser emitting unit for emitting a laser beam onto the optical disk;

a clock detecting unit for detecting a clock signal by obtaining a tangential push-pull signal which is a signal of a difference in light quantity of reflected light of the laser beam emitted onto each of the plurality of clock areas in a tangential line direction of the optical disk;

an address reproducing unit for re producing the address information by obtaining a radial push-pull signal which is a signal of a difference in light quantity of reflected light of a laser beam emitted onto the first address area and/or the second address area along a radius direction of the optical disk;

a recording/reproducing unit for recording/reproducing data into/from the optical disk based on the address information reproduced by the address reproducing unit; and a clock generating unit for generating a recording clock and a reproducing clock of the data based on the tangential push-pull signal.

According to the above arrangement, deterioration of a data reproducing signal caused by a change in light quantity or disturbance of the light deflected direction can be prevented, thereby improving an S/N ratio. In addition, a clock can be reproduced in a stable manner independently of the data, and the clock can be reproduced independently of tracking. Also, the clock can be reproduced from a short mark. Further, the address information can be reproduced in a reliable manner even if the quality of the address information signal is deteriorated by a radial tilt.

Furthermore, because the first and second address segments are separated from each other, even if the clock mark in the first address segment is broken by a defect or a flaw of the disk and a clock is not reproduced normally from this broken clock mark when reproducing address, propagation of the adverse effect of the broken clock can be limited, thereby offering an effect that the address can be reproduced in a more reliable manner.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a table explaining address information of the optical disk of FIG. 1;

FIG. 6 is a table explaining a zone format of the optical disk of FIG. 1;

FIG. 10 is a view explaining a conventional optical disk; and

FIG. 11 is a view explaining address information of the conventional optical disk.

DESCRIPTION OF THE EMBODIMENTS

Referring to the accompanying drawings, the following description will describe one embodiment of the present invention.

Figure 1:
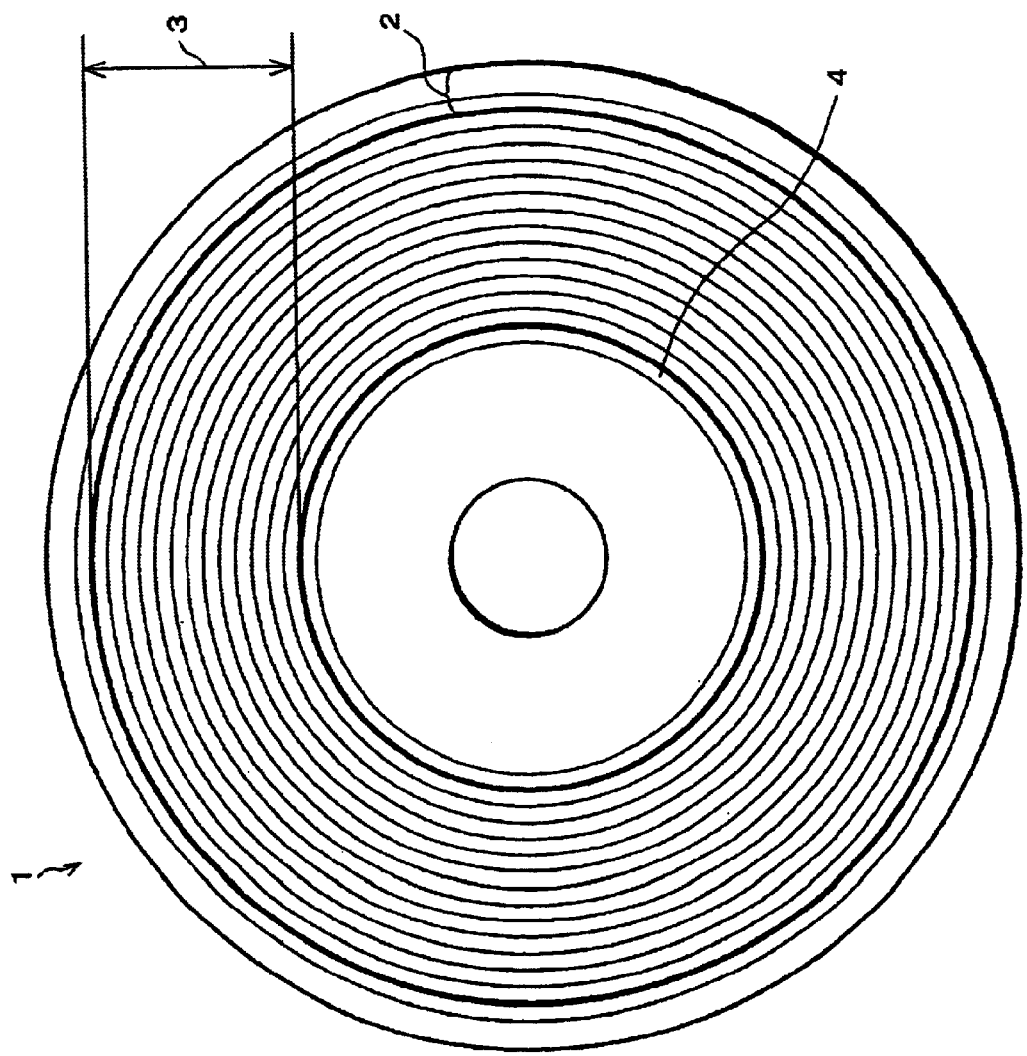
FIG. 1 is a schematic view explaining an optical disk in accordance with one embodiment of the present invention.

A magneto-optical disk 1 (optical disk; hereinafter, referred to simply as disk 1) adopting the present invention is composed of, as shown in FIG. 1, a lead-in area 2 provided in the outermost portion, a lead-out area 4 provided in the innermost portion, and a user area 3 provided between the lead-in area 2 and lead-out area 4.

Figure 2:
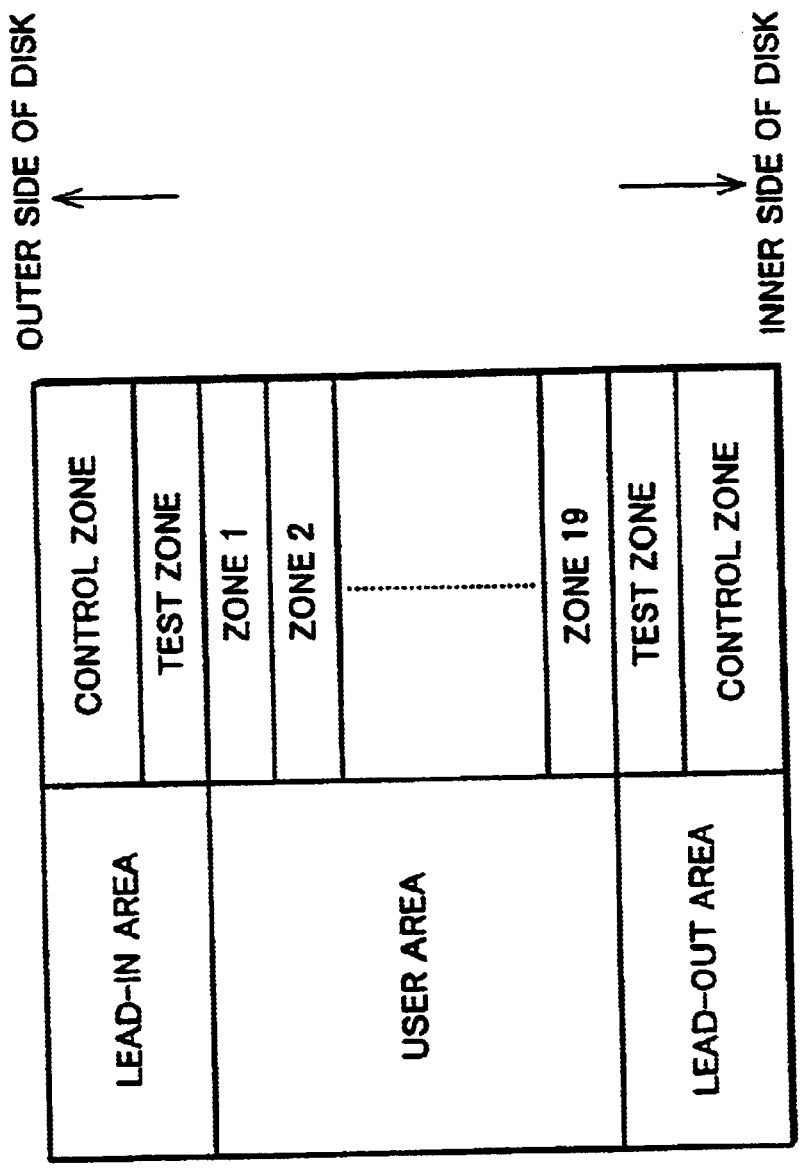
FIG. 2 is a view explaining a zone structure of the optical disk of FIG. 1.

FIG. 2 is a schematic view depicting each of the foregoing areas. Each of the lead-in area 2 and lead-out area 4 is provided with a control zone showing identification information of the disk format, etc., and a test zone as an area for finding data recording/reproducing conditions by running a test.

The user zone 3 is divided into 19 zones from Zone 1 to Zone 19, and data is recorded/reproduced by the ZCAV method or ZCLV (Zoned Constant Linear velocity) method. How the user zone 3 is divided will be described below in detail.

Figure 3:
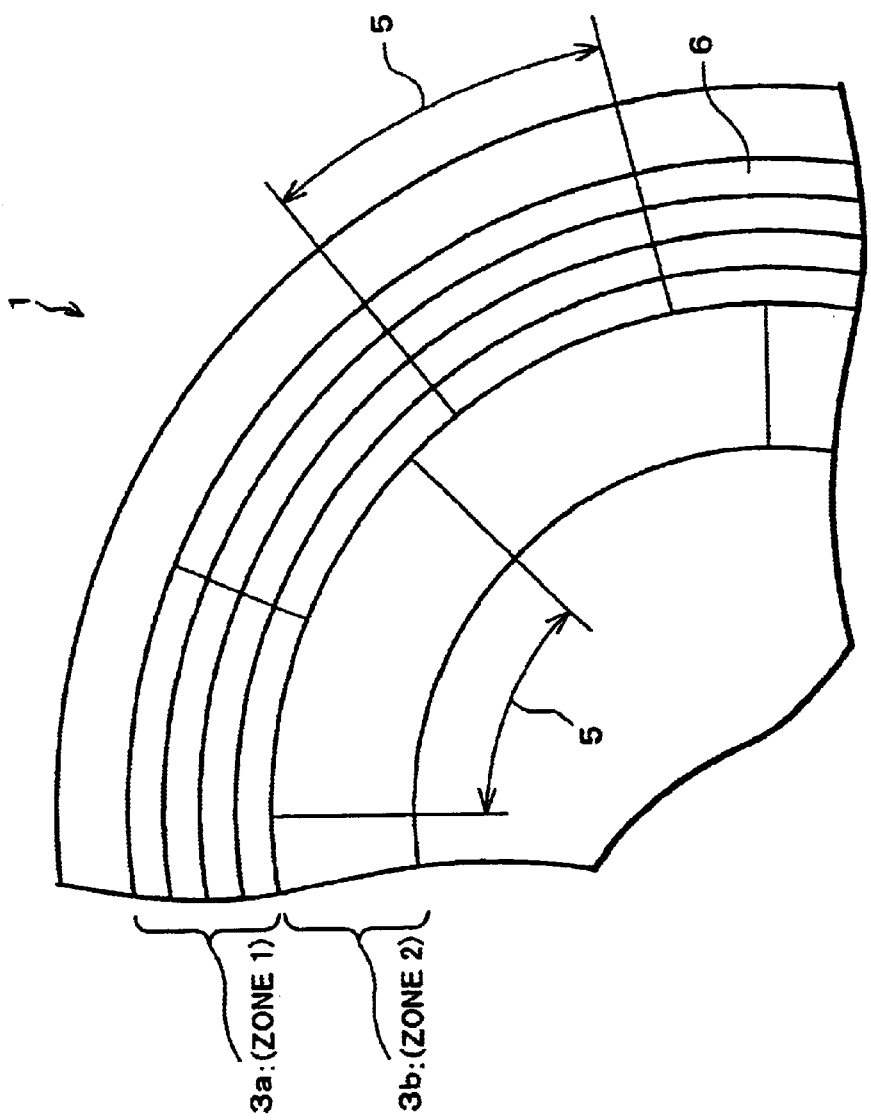
FIG. 3 is a view explaining a sector structure of the optical disk of FIG. 1.
Figure 4:
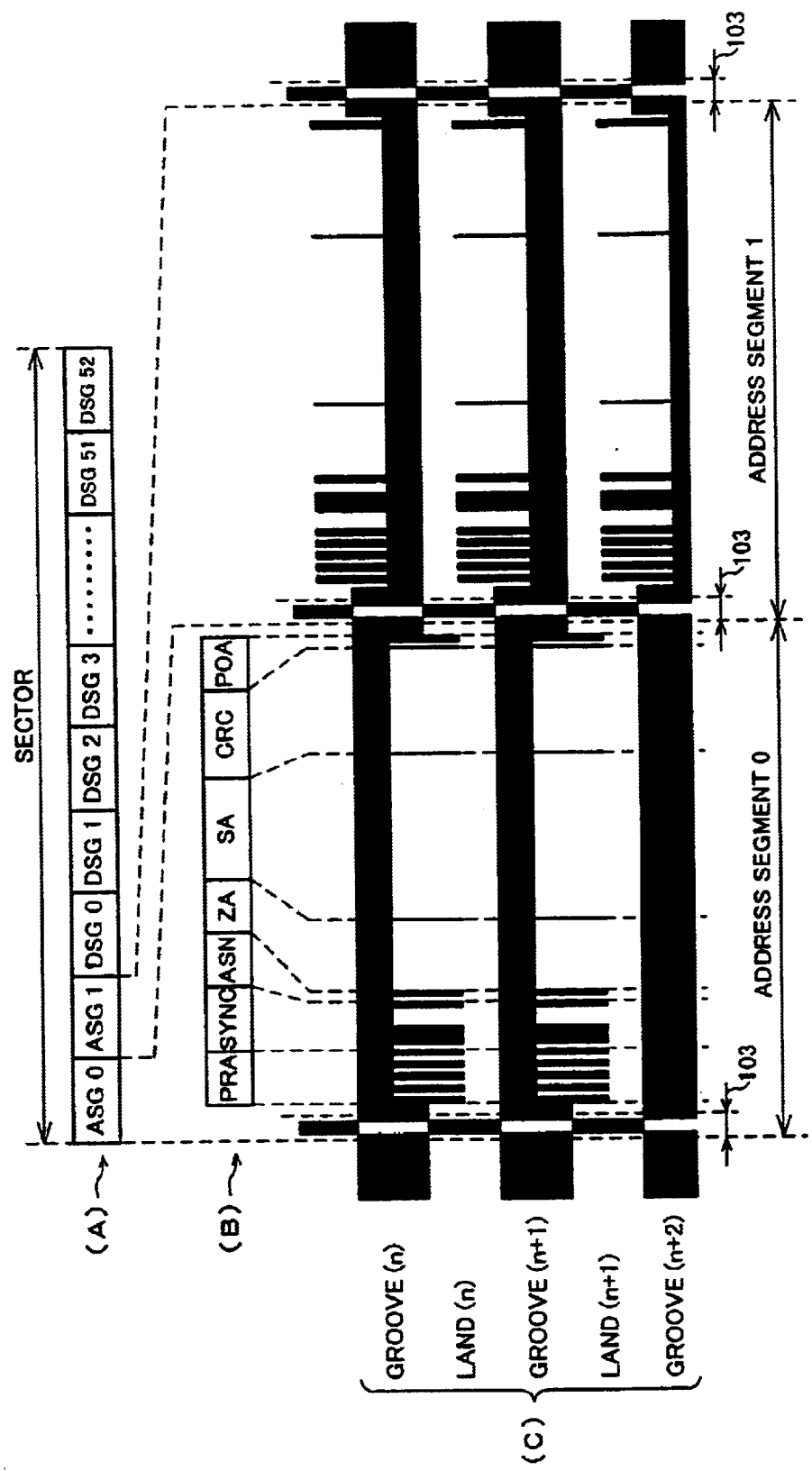
FIG. 4 is a view explaining a sector and segment structure of the optical disk of FIG. 1.

The following will explain the sector and segment structure in the disk 1 with reference to FIGS. 3 and 4.

FIG. 3 shows the sector structure in Zone 1 (corresponding to an area 3a) and Zone 2 (corresponding to an area 3b), and FIG. 4 shows the detailed sector and segment structure. In the following explanation, one track corresponds to one round of the disk 1, and a plurality of tracks are provided concentrically or spirally.

Each zone includes a given number of tracks 6 along the radius direction. The given number of tracks 6 may be the same or different in each zone. As shown in FIG. 3, each track 6 forms one unit serving as a sector 5 or is divided into more than one unit (sector 5) along its extension direction (tangential line direction). Here, each track is provided with an integer number of the sectors 5, and the number of the sectors 5 in each track 6 in the same zone is the same. As shown in FIG. 3, the sectors 5 in each track 6 in the same zone are aligned radially (that is, along the radius direction of the disk). The number of the sectors 5 in each track 6 is different in each zone.

As shown by (A) in FIG. 4, each sector 5 is divided into a total of 55 segments including an address segment 0 (ASG 0) as a segment including a first address area, another address segment 1 (ASG 1) as a segment including a second address area, and 53 data segments (DSG 0–DSG 52) (corresponding to the data area). Each sector 5 invariably includes 55 segments regardless of the positions of the sector 5, track 6, and zone, and the segments in different tracks 6 in each zone are aligned radially (along the radius direction of the disk) according to their respective kinds. In the present embodiment, 55 segments are given to the sector 5, but it should be appreciated that the number of the segments in each sector 5 is not especially limited in the present invention.

Each of the address segment 0 (ASG 0) and address segment 1 (ASG 1) is provided with address information.

As shown by (B) in FIG. 4, the address information is composed of a 4.5-bit preamble (PRA); a 4-bit synchronous signal (SYNC); a 1-bit address segment number (ASN); a 6-bit zone address (ZA); a 17-bit sector address (SA); a 14-bit error detecting code (CRC); and a 1-bit postamble (POA). Data is recorded in the zone address (ZA), sector address (SA), and error detecting code (CRC) by means of bi-phase modulation. Hence, these elements are so-called DC-free elements and give no adverse effect to tracking. The preamble (PRA) is provided to effect phase synchronization when reproducing address information, and the most dense pattern, such as "01010101" is used. The synchronous signal (SYNC) is a signal to have synchronization in reproducing the zone address (ZA), etc., and therefore, it is a unique signal to a bi-phase modulated zone address, etc. For example, the synchronous signal (SYNC) is a pattern, such as "1000110" or "01110001". The address segment number (ASN) is the information indicating the number of the address segment. The zone address (ZA) is an address showing the number of each of the divided zones (FIG. 2) along the radius direction of the disk 1, and given with a value that increments for each zone from the outer side to the inner side of the disk. The sector address (SA) is an address of the sector 5 corresponding to the address segment. In other words, it is an address in the tangential line direction (equivalent to the extension direction of the recording tracks) and the radius direction of the disk 1. More precisely, a value such that shows "0" at the start position of the zone, and keeps incrementing along the tangential line direction from the outer side to the inner side of the disks is given. The error detecting code (CRC) is data used in detecting an error in the address segment number (ASN), zone address (ZA), and sector address (SA). The error detecting code may be replaced with an error correcting code, for example.

The lands and grooves are shown by (C) in FIG. 4. For example, as to the groove (n), the address segment 0 is wobbled at one side wall alone, whereby the address information shown by (B) in FIG. 4 is recorded. On the other hand, the address segment 1 is wobbled at the other side wall (the non-wobbled side wall in the segment 0), whereby the address information shown by (B) in FIG. 4 is recorded. As to the grooves (n+1), the address segment 0 and address segment 1 are wobbled in the same manner as above.

The difference between the address information in the address segment 0 and the address information in the address segment 1 is the address segment number (ASN) and the error detecting code (CRC) that changes with the address segment number (ASN). On the other hand, the same value is given to the zone address (ZA) and sector address (SA). Because the allocation of information including the preamble (PRA) and synchronous signal (SYNC) within the address segment is the same, one reproducing circuit can be shared. This address information can be detected by a radial push-pull signal.

As has been discussed, the address information is allocated independently to two segments, address segment 1 and address segment 0, and each address segment is wobbled at one of the two side walls forming the groove while the opposite side wall is wobbled in the address segment 0 and address segment 1, respectively. Consequently, the quality of the address signal can be ensured even if a tilt in the radius direction of the disk, that is, a radial tilt is large. More specifically, as can be understood from the results shown in FIG. 11, if the radial tilt increases markedly to the plus side, the quality of the address signal from the address segment 0 is deteriorated. However, because the address information is recorded into the address segment 1 by means of wobbling at the other side wall (non-wobble side wall in the address segment 0), the address amplitude of the address signal from the address segment 1 shows characteristics obtained by inverting the address amplitude shown in FIG. 11 from the left to right with respect to the 0 (zero) radial tilt (plus-to-minus inversion). Thus, the quality of the address signal is hardly deteriorated. Conversely, if the radial tilt increases markedly to the minus side, the quality of the address signal from the address segment 1 is deteriorated. However, the quality of the address signal from the address segment 0 is hardly deteriorated. Also, the quality of the address signal in response to the radial tilt on the lands changes in the opposite polarity, but the similar effect can be attained. Hence, a larger radial tilt margin can be secured.

In addition, if a normal quantity is given to the radial tilt, the correct address information can be reproduced from both the address segment 0 and address segment 1. Hence, the reliability of the address can be enhanced.

Even if the clock mark (clock area) in the address segment 0 is broken by a defect or flaw of the disk and a clock is not generated from this broken clock mark normally when reproducing an address, propagation of a clock error caused in the address segment 0 can be limited, because the address segment 1 is separated from the address segment 0 as a different segment. Consequently, the address can be reproduced in a more reliable manner.

The address of the one-side wobbling address using two segments can indicate the address information shared by a particular groove and a land adjacent to this particular groove. In other words, in the address segment 0, a pair of the groove (n) and land (n) and a pair of the groove (n+1) and land (n+1) share their respective address information, whereas in the address segment 1, a pair of the groove (n+1) and land (n) and a pair of the groove (n+2) and land (n+1) share their respective address information. Consequently, the address segment can be given as a common address area for both the land and groove, and this offers a significant effect in reducing redundancy caused when allocating the address information.

FIG. 5 shows the details of address information on each groove and land in Zone 1 (FIG. 2) of the user area, where each track includes 37 sectors. In the table, groove (n), land (n), groove (n+1), land (n+1), groove (n+2), and land (n+2) are adjacent to each other along the radius direction of the disk and form a track group. Also, the table shows values of the address segment number (ASN), zone address (ZA), and sector address (SA) in each of the address segment 0 and address segment 1.

The address segment number (ASN) is the same in all the grooves and lands, and "0" is given in the address segment 0 and "1" is given in the address segment 1. The zone address (ZA) is also the same in all the grooves and lands, and "1" is given to both the address segment 0 and address segment 1 because the table shows the details of Zone 1.

The sector address (SA) increments for each of the sectors aligned along the tangential line direction of the disk, and does so for the tracks in the inner side of the disk as well. In other words, the optical disk of the present embodiment includes, as the address information, information (sector address) given with a value that increments from the outer side to the inner side of the optical disk. Herein, the address information when "100" is given as the sector address of a specific sector in the groove (n) is shown, and "100" is given to the sector address (SA) in both the address segment 0 and address segment 1 in the specific sector in the groove (n). In case of the land (n), "100" is given to the sector address (SA) in the address segment 0 as was discussed above, and "137" is given to the sector address (SA) in the address segment 1. This is because the address segment 1 in the land (n) is shared by the groove (n+1), and the sector address (SA) in the address segment 1 in the land in this zone is a sum of the sector address (SA) in the address segment 0 and 37, the number of the sectors per track. It should be appreciated that the land (n) is aligned in the inner side of the groove (n).

Thus, the same sector address can be given to both the address segment 0 and address segment 1 on the grooves. Alto, the same sector address as that given to the adjacent groove is given to the address segment 0 on the lands, and a sum of the address value in the address segment 1 and the number of sectors per track is given to the address segment 1 on the lands. Consequently, the optical disk apparatus only has to correct the sector address value on the lands in the address segment 1, thereby making the address conversion easier. In addition, because the address segment number is given, the address segment 0 and address segment 1 can be distinguished from each other in a reliable manner. Thus, the sector timing can be generated based on the address segment in a more reliable manner.

Next, the following will explain data recorded in the data segments.

The data segments are used to record main data at a user command by means of a so-called magneto-optical recording method, by which the magnetic field is modulated by emitting a laser beam and applying a magnetic field. To be more specific, as shown by (A) in FIG. 4, main data is recorded into the data segment 0 (DSG 0) to data segment 52 (DSG 52). That is, the main data is recorded into each segment except for the head where the clock mark is appended. Each segment has a data capacity of 47.5 bytes. The size of the clock mark is 2.5 bytes. The volume of data recorded by means of magneto-optical recording in each segment is eight times as much as the volume of the address information recorded in the address segment by means of wobbling. In other words, the address is recorded as 47.5-bits information in each segment by means of wobbling, whereas the main data is recorded as 47.5-byte information in each segment by means of magneto-optical recording. The main data is recorded in the data segments sector by sector together with an ECC (Error Correction Code) and header information. The header information includes reference information, etc. used in reproduction. However, like the ECC, the header information is not a factor that affects the subject matter of the present invention and can take various forms, and the further explanation is omitted herein for ease of explanation. The address information or the like is not recorded by means of wobbling in the data segments. In other words, the data segments are so-called non-wobble DC grooves. Each data segment is provided with (1) an area for preventing imperfect erasure caused by overwriting and (2) an area for absorbing a position shift caused by a change in recording power.

A clock mark (clock area) 103 is appended to the head of each of the address segments and data segments. The clock marks 103 are convex marks on the grooves and concave marks on the lands, and aligned at regular intervals along the disk's tangential line direction and radially along the radius direction of the disk. By this arrangement, the clock marks can be detected by a tangential push-pull signal from each of the lands and grooves. Consequently, a clock can be generated in a stable manner independently of data without being affected adversely by a tracking offset or a tilt in the radius direction of the disk, thereby increasing the recording density. Further, because a clock can be reproduced from a short mark, the redundancy of the data (more precisely, the clock mark) can be reduced, and as a consequence, the recording density can be increased. A clock generated from this clock mark responds to an error in the number of rotations of the disk and a change in linear velocity caused by decentering. Hence, if this clock is used as a reference clock when recording/reproducing data like in the present invention, the data can be recorded/reproduced into/from the disk at an absolute position at high accuracy.

As has been discussed, in the disk 1, of all the 55 segments forming the sector, the address information is recorded into the first two segments as the wobbled address segments, and the main data is recorded into the rest of the non-wobbled segments, that is, the data segments in the so-called straight grooves by means of magneto-optical method. Hence, in the disk 1, the data segments for recording the main data can be physically separated from the address segments for recording the address. Consequently, with the disk 1, deterioration of the reproducing signal of the main data caused by a change in light quantity or disturbance of the light deflected direction can be prevented, thereby improving an S/N ratio. Also, with this disk 1, the wobbles do not have to be provided throughout the recording track, and the disk can be manufactured easily.

As has been discussed, the optical disk of the present invention is an optical disk including concentrical or spiral lands and grooves both used as recording tracks each divided into sectors used as units in writing/reading out data. Each sector provided in each recording track is composed of:

1) the first address area for recording the address information at one of two walls (the aforementioned side wall of the grooves or lands) at boundaries between each recording track and adjacent recording tracks alone by means of wobbling;

2) the second address area for recording the address information by means of wobbling at the other wall on a non-wobbled side in the first address area alone by means of wobbling;
3) the data area sandwiched by non-wobbled portion of the two walls;
4) a plurality of clock areas provided discretely along the tangential line direction of the recording tracks (disk's tangential line direction), each sandwiched by two areas at a head and a bottom, respectively, each and said two areas having different light reflection.

Each sector is divided into a plurality of segments along the tangential line direction, and the first address area is placed in the first segment at the head of each sector and the second address area is placed in the second segment adjacent to the first segment, and the clock areas are placed in the segments, respectively.

Next, the following will explain an optical disk apparatus of the present invention for recording/reproducing main data into/from the foregoing disk 1.

Figure 7:
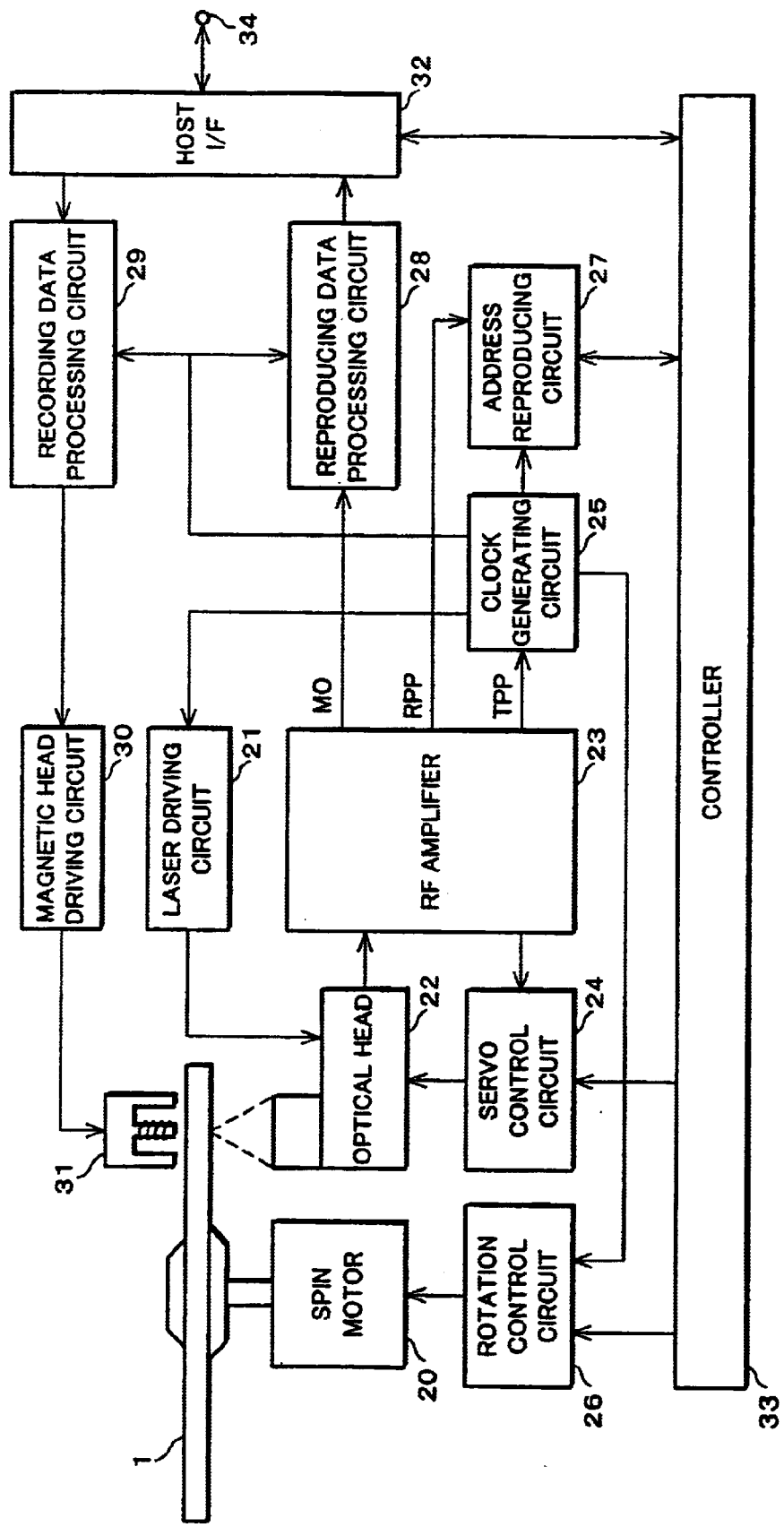
FIG. 7 is a block diagram depicting an arrangement of an optical disk apparatus in accordance with one embodiment of the present invention.

FIG. 7 is a block diagram depicting an arrangement of the optical disk apparatus. The optical disk apparatus comprises a spin motor 20, a laser driving circuit 21, an optical head (laser emitting means, recording/reproducing means) 22, an RF amplifier 23, a servo control circuit 24, a clock generating circuit (clock detecting means, clock generating means) 25, a rotation control circuit 26, an address reproducing circuit (address reproducing means) 27, a reproducing data processing circuit 28, a recording data processing circuit 29, a magnetic head driving circuit 30, a magnetic head (recording/reproducing means) 31, a host interface 32, and a controller 33.

The disk 1 is supported by the spin motor 20, and rotated by the rotation control circuit 26 at a predetermined number of rotations for each zone in the disk 1. The controller 33 sends/receives data to/from an unillustrated upper class control device through a terminal 34 via the host interface 32, and supplies data to be recorded to the recording data processing circuit 29 or receives data to be reproduced from the reproducing data processing circuit 28. The controller 33 also controls the servo control circuit 24 or the like which will be described below, and determines a position at which a laser beam from the optical head 22 should be converged in the track into/from which the data is recorded/reproduced. The optical head 22 is composed of a semiconductor laser, an objective lens, a photodetector, etc., and emits a laser beam onto the disk 1 at a predetermined power when writing the data. When reading out the data, the optical head 22 detects reflected light from the disk 1 by the photodetector, and supplies the RF amplifier 23 with reproducing currents. The magnetic head 31 is driven by the magnetic head driving circuit 30 so as to apply a magnetic field to the disk 1. The magnetic head 31 is positioned to oppose the optical head 22 with the disk 1 inbetween, and records data into the disk 1 by means of magnetic field modulation, for example. The RF amplifier 23 converts a current output from the photodetector in the optical head 22 into a voltage signal, and outputs a main data reproducing signal (MO), a tangential push-pull signal (TPP) used in reproducing the clock mark, and a radial push-pull signal (RPP) used in reproducing the address information, while supplying the servo control circuit 24 with a servo error signal necessary for the focus servo and tracking servo. The reproducing data processing circuit 28 samples the reproducing signal (MO) based on the clock supplied from the clock generating circuit 25, and converts the sampled reproducing signal into binary data, and outputs the demodulated and error-corrected main data as the reproducing data. The clock generating circuit 25 is supplied with the tangential push-pull signal (TPP), and identifies the clock mark position by detecting a light quantity change component (clock signal) from the clock mark appended at the head of each segment in the disk 1 by using the supplied tangential push-pull signal (TPP) Then, a clock having a frequency 400 times as high as the clock mark and in sync with the clock mark is generated by an internal PLL (Phase Locked Loop) circuit as a clock (recording clock/reproducing clock) matched with the bit frequency of the recording/reproducing data. The clock generated by the clock generating circuit 25 is supplied to the reproducing data processing circuit 28, and used as a reproducing clock in sync with the reproducing signal (MO). The clock is supplied to the recording data processing circuit 29, and used as a bit timing signal when recording the data. Further, the clock is supplied to the address reproducing circuit 27, and used in detecting the address information when reproducing/recording data. The clock mark signal generated by the clock generating circuit 25 is also supplied to the rotation control circuit 26. The rotation control circuit 26 controls the disk rotations precisely in each zone in accordance with the ZCLV method not by using any special detecting means for detecting the position along the radius of the disk or the number of rotations of the disk, but by merely comparing the cycle of the clock mark signal detected by the clock generating circuit 25 with the predetermined reference cycle. The address reproducing circuit 27 is supplied with the radial push-pull signal (RPP), and reproduces the address information from the wobble at the address segment in the disk 1 by using the supplied radial push-pull signal (RPP). In other words, the address reproducing circuit 27 detects the zone address and sector address into/from which the data is recorded/reproduced by the optical head 22, and supplies the address information thus obtained to the controller 33. Here, by decoding the address based on the clock from the clock generating circuit 25, the PLL circuit or the like for exclusively reproducing the address can be omitted. The recording data processing circuit 29 appends an error correcting code and effects modulation to the main data which will be supplied via the host interface 32 to be recorded into the disk 1, and supplies the same to the magnetic head driving circuit 30. Here, the recording data processing circuit 29 carries out the foregoing predetermined processing based on the clock supplied from the clock generating circuit 25. The magnetic head driving circuit 30 drives the magnetic head 31 in good association with a laser beam emitted from the optical head 22, and records the main data into the disk 1 by means of magneto-optical recording.

Here, the optical disk apparatus records the data in the data segments alone. In other words, no data is recorded into the address segments. Thus, the optical disk apparatus can prevent deterioration of the quality of a data reproducing signal caused by a change in light quantity or disturbance of the light deflected direction, thereby improving an S/N ratio of the reproducing signal.

Figure 8:
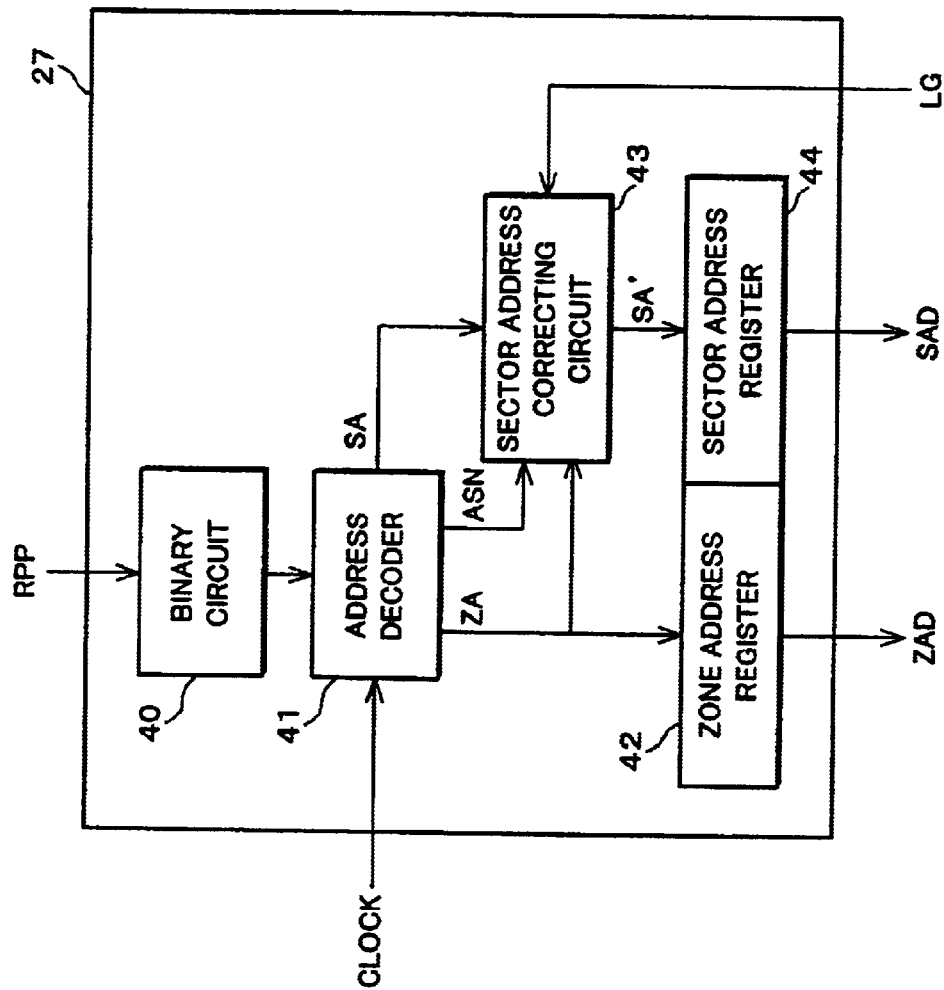
FIG. 8 is a block diagram depicting an example address reproducing circuit as an integral part of the arrangement of FIG. 7.

FIG. 8 is a block diagram depicting an arrangement of the address reproducing circuit 27. The radial push-pull signal (RPP) generated by the RF amplifier 23 is converted into binary data by a binary circuit 40, and supplied to an address decoder 41. The address decoder 41 decodes the address information shown by (B) in FIG. 4 by using the clock generated by the clock generating circuit 25 (FIG. 7) based on the clock mark. When decoding the address information, the reproduction phase is adjusted by the preamble (PRA); the bit synchronization of the address information is effected by the synchronous signal (SYNC); and a reproduction error as to the address segment number (ASN), zone address (ZA), and sector address (SA) is checked by the error detecting code (CRC). If no error is detected, the zone address is set in a zone address register 42, and the sector address (SA) is supplied to a sector address correcting circuit (address information correcting means) 43. The sector address correcting circuit 43 corrects the sector address (SA) only when it is judged that the data is reproduced from the land and "1" is given as the address segment number based on the address segment number (ASN) supplied from the address decoder 41 and the set information (LG) supplied from the controller (land/groove judging means) 33 indicating whether the recording track in question is the land or groove.

The foregoing correction relates to the content of the address information explained with reference to FIG. 5, and because a value to be corrected (the number of sectors in each track) differs in each zone, a correction value is changed as necessary by the zone address (ZA) from the address decoder 41. Consequently, the sector address register 44 is always set with a correct (corrected) sector address (SA'). The zone address information (ZAD) and sector address information (SAD) are supplied from the zone address register 42 and sector address register 44, respectively to be used in the controller 33.

Figure 9:
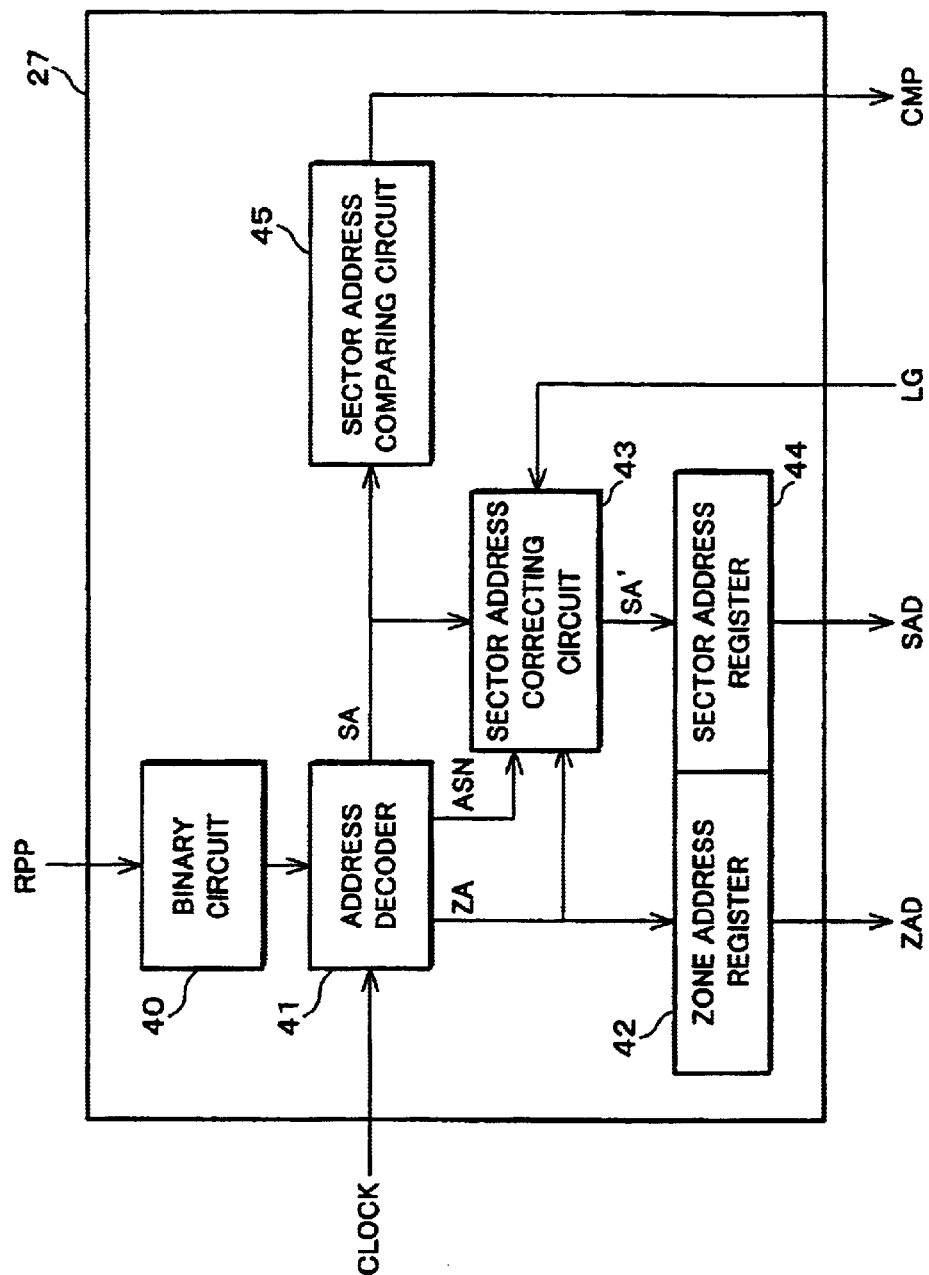
FIG. 9 is a block diagram depicting another example address reproducing circuit as an integral part of the arrangement of FIG. 7.

FIG. 9 is a block diagram depicting another example of the address reproducing circuit 27. In the drawing, like components are labeled with like reference numerals with respect to FIG. 8, and the description of these components is not repeated for ease of explanation. The arrangements in FIGS. 8 and 9 are identical except that a sector address comparing circuit 45 is additionally included in the arrangement in FIG. 9. The sector address comparing circuit 45 compares the sector addresses in the address segment 0 and address segment 1 from which the address information is reproduced by the address decoder 41 and an error is detected. Subsequently, a comparison result (CMP) is outputted to the controller 33.

As has been discussed with reference to FIG. 5, the comparison between the sector addresses in the same groove always shows the match (same sector address), but the comparison between the sector addresses in the same land always shows a difference. Thus, by using the above comparison result, an erroneous distinguishment between the land and groove can be prevented particularly in the transient tracking servo state involving an access action.

The magneto-optical disk was explained as one embodiment of the present invention. However, the present invention is not limited to the magneto-optical disk, and it can be applied to other types of disks, such as phase-change disks.

Next, the following will explain an example where the format in the disk 1 of the present invention is applied to a 50 mm-disk with reference to FIG. 6.

FIG. 6 is a table showing parameters in each zone when the user area 3 in the disk 1 is divided into 19 zones. In the table, the zone number in the left is a unique number (value) assigned to each zone. The value assigned herein is also used as the zone address (ZA) in the address segment. The start position along the radius indicates the start position along the radius in each zone, and in the present embodiment, the zones are allocated sequentially from the outer side to the inner side. The number of tracks indicates a total number of the tracks in each zone. The number of segments indicates the number of segments per track in each zone, that is, the number of clock marks, and is given with a different integer in each zone. This means that the clock marks are aligned radially along the radius direction of the disk in each zone. The number of sectors indicates the number of sectors per track in each zone, and is given with a different integer in each zone. In other words, the sectors are aligned radially along the radius direction of the disk in each zone, and so are the address segments. A total number of the sectors indicates the number of sectors in each zone. The user capacity indicates a data capacity the user can actually use in each zone. A buffer track used for the zone boundary established in each zone, a test track to run a test on the recording/reproducing conditions, etc., and a spare track to serve as an alternative for a defective sector are excluded from the data capacity. The bit length indicates a bit length of recording data in the innermost portion having the most highest linear recording density in each zone. The number of rotations indicate the number of rotations of the disk in each zone, and the linear velocity indicates a disk linear velocity in the innermost portion in each zone. The user bit rate indicates an average bit rate of the user data given when the disk 1 is traced consecutively in each zone.

In the present embodiment, the rotations of the disk 1 is controlled by the ZCLV method. Thus, substantially the same bit length indicating the recording density is given by the zone dividing, and the number of rotations is changed in each zone while the liner velocity remains substantially the same in all the zones. In the ZCLV method, the recording/reproducing frequency is always the same in all the zones, and so is the user bit rate. Thus, the data can be recorded/reproduced into/from the optical disk at the highest bit rate and the same recording/reproducing conditions are given. Consequently, the ZCLV method has a merit that the apparatus structure for recording/reproducing data can be made simpler.

In the present embodiment, a total of the user capacities is approximately 1140 MB, and with this total capacity, digitally compressed motion picture information, for example, an image compressing stream of the MPEG2 (Moving Picture Expert Group 2) method can be recorded into a 50 mm-disk for approximately 30 minutes at a rate of 5 Mbps. Consequently, the present optical disk apparatus can realize a portable movie, that is, a super-compact disk camera.

In addition, the optical disk of the present invention is arranged to use the zones of the user area from the outer side to the inner side of the disk. Thus, the zones are used in the increasing order of the number of rotations (from the smaller to the larger number of rotations). For this reason, the optical disk requires a shorter time to reach the predetermined number of rotations since insertion into the optical disk apparatus, thereby shortening the waiting-time until the apparatus becomes ready for the recording. In addition, the lower number of rotations can save the power consumption of the optical disk apparatus, and in particular, in case of a portable apparatus, the lower number of rotations can contribute to extend a battery driving time.

The optical disk of the present invention may be arranged in the following manner:

a plurality of zones are provided by dividing the data recording area (corresponding to the user area 3 in FIG. 1) along the radius direction of the disk in such a manner that each zone includes a predetermined number of recording tracks;

in each zone, the segment including the first address area, segment including the second address area, and the clock areas on each recording track in each zone are aligned radially according to their respective kinds; and the number of sectors and segments per recording track increases in the zones from the inner side to the outer side of the disk.

According to the above arrangement, substantially the same recording density can be given across the disk, and the data recording capacity can be increased as an additional effect.

The optical disk of the present invention may be arranged in such a manner that information given with a value that increments from the outer side to the inner side is used as the address information.

According to the above arrangement, the optical disk apparatus can start the operation shortly after the optical disk is inserted therein, and the power consumption can be saved by controlling the rotations as an additional effect.

The optical disk of the present invention may be arranged in such a manner that at least a zone address indicating the address of each zone and a sector address indicating the address of each sector in the zone are recorded in each of the first and second address areas as the address information by means of wobbling.

According to the above arrangement, the zone currently processed can be identified directly by reproducing the address, thereby making the band identification on the optical disk apparatus easier. In addition, address information interpolation can be readily carried out when an address error occurs. Further, the address conversion for a defective sector can be readily effected to effect slipping as a defect management as another effect.

The optical disk of the present invention may be arranged in such a manner that the address information of the same content is recorded into both the first and second address areas in the sectors on the same groove.

According to the above arrangement, neither the first nor the second address is converted on the groove, and the first address is not converted on the land. In other words, only the second address on the land has to be converted. Thus, the address conversion can be effected easily on the optical disk apparatus as another effect.

The optical disk of the present invention may be arranged in such a manner that the address information recorded into the first address area and the address information recorded into the second address area include their respective address segment numbers.

According to the above arrangement, the first address (the address information reproduced from the first address area) and the second address (the address information reproduced from the second address area) can be distinguished from each other in a reliable manner. Hence, recording/reproducing into/from the sector can be carried out in a more reliable manner. Also, by merely comparing the first address with the second address, whether the recording track on which the first and second address areas are positioned is the land or groove can be judged in a reliable manner.

The optical disk apparatus of the present invention may be an optical disk apparatus for recording/reproducing data into/from an optical disk in which the address information of the same content is recorded in both the first and second address areas in the sectors on a particular groove, arranged in such a manner that address information correcting means for correcting the address information reproduced from the second address area on the land adjacent to that particular groove by the address reproducing means is additionally provided.

By the above arrangement, that is, by providing address information correcting means for correcting the address information reproduced from the second address area on the land alone, the address conversion can be effected readily as another effect.

The optical disk apparatus of the present invention may be arranged in such a manner that the address information correcting means corrects the address information based on the detection result of the address segment number included in the address information.

As has been discussed, if the address information includes the address segment number, the address information correcting means can correct the address information based on the detection result of the address segment number. In other words, it has become possible to provide a highly reliable optical disk apparatus which can correct the address information in a more reliable manner as another effect.

The optical disk apparatus of the present invention may further include land/groove judging means for judging whether the recording track on which the first and second address areas are positioned is the land or groove by comparing the address information reproduced from the first address area with the address information reproduced from the second address area.

According to the above arrangement, the land and groove can be distinguished from each other in a more reliable manner, and as a consequence, a highly reliable optical disk apparatus can be provided as another effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk having concentrical or spiral lands and grooves both used as recording tracks each divided into sectors used as units in writing/reading out data, wherein each of said sectors provided in each of said recording tracks includes:

a first address area for recording address information at one of two walls at boundaries between each recording track and adjacent recording tracks alone by means of wobbling;

a second address area for recording the address information at the other wall on a non-wobbled side in said first address area alone by means of wobbling;

a data area sandwiched by non-wobbled portions of said two walls; and a plurality of clock areas provided discretely along a tangential line direction of the recording tracks, each sandwiched by two areas at a head and a bottom, respectively, each and said two area having different light reflection, wherein:
   each sector is divided into a plurality of segments along the tangential line direction;
   said first address area is placed in a first segment at a head of each sector;
   said second address area is placed in a second segment adjacent to said first segment; and
   said plurality of clock areas are placed in said plurality of segments, respectively.

2. The optical disk of claim 1, wherein:
   a data recording area across said disk is divided into a plurality of zones along a radius direction of the disk so that each zone includes a predetermined number of recording tracks;
   in each zone, said first segment including said first address area, said second segment including said second address area, and said plurality of clock areas positioned in each different recording track are aligned radially according to their respective kinds; and the numbers of said sectors and segments per recording track increases in the zones from an inner side to an outer side of the disk.

3. The optical disk of claim 2, information given with a value that increments from the outer side to the inner side of the disk is included as the address information.

4. The optical disk of claim 2, wherein at least a zone address indicating an address of each zone, and a sector address indicating an address of each sector within the zone are recorded, as the address information, into each of said first address area and second address area by means of wobbling.

5. The optical disk of claim 1, wherein information indicating a same address is recorded into said first address area and second address area in each sector on a same groove.

6. The optical disk of claim 1, wherein the address information recorded in said first address area and the address information recorded in said second address area include their respective address segment numbers.

7. An optical disk including:
   concentrical or spiral lands and grooves both used as recording tracks each divided into sectors used as units in writing/reading out data;
   a first address area for recording address information at one of two walls forming the grooves alone by means of wobbling;
   a second address area for recording the address information at the other wall on a non-wobbled side in said first address area alone by means of wobbling;
   a data area sandwiched by two non-wobbled walls;
   a plurality of clock areas, provided discretely along a tangential line direction of the recording tracks, each appended with head and bottom portions, each and said head and bottom portions having different light reflection,
   wherein:
      each sector is divided into a plurality of segments;
      said first address area is placed in a first segment;
      said second address area is placed in a second segment; and
      said plurality of clock areas are placed in said plurality of segments, respectively.

8. An optical disk apparatus for recording/reproducing data into/from an optical disk having concentrical or spiral lands and grooves both used as recording tracks each divided into sectors used as units in writing/reading out data, wherein each of said sectors provided in each of said recording tracks includes:
   a first address area for recording address information at one of two walls at boundaries between each recording track and adjacent recording tracks alone by means of wobbling;
   a second address area for recording the address information at the other wall on a non-wobbled side in said first address area alone by means of wobbling;
   a data area sandwiched by non-wobbled portions of said two walls; and
   a plurality of clock areas provided discretely along a tangential line direction of the recording tracks, each sandwiched by two areas at a head and a bottom, respectively, each and said two areas having different light reflection,
      each sector being divided into a plurality of segments along the tangential line direction,
      said first address area being placed in a first segment at a head of each sector,
      said second address area being placed in a second segment adjacent to said first segment, and
      said plurality of clock areas being placed in said plurality of segments, respectively,
   said apparatus comprising:
      laser emitting means for emitting a laser beam onto said optical disk;
      clock detecting means for detecting a clock signal by obtaining a tangential push-pull signal which is a signal of a difference in light quantity of reflected light of the laser beam emitted onto each of said plurality of clock areas in a tangential line direction of said optical disk;
      address reproducing means for reproducing the address information by obtaining a radial push-pull signal which is a signal of a difference in light quantity of reflected light of a laser beam emitted onto said first address area and/or said second address area along a radius direction of said optical disk;
      recording/reproducing means for recording/reproducing data into/from said optical disk based on the address information reproduced by said address reproducing means; and
      clock generating means for generating a recording clock and a reproducing clock of said data based on said tangential push-pull signal.

9. The optical disk apparatus of claim 8, wherein the address information of a same content is recorded into said first and second address areas in each sector on a particular groove of said optical disk, said apparatus further comprising:
   address information correcting means for correcting the address information reproduced by said address reproducing means from said second address area on a land adjacent to said particular groove.

10. The optical disk apparatus of claim 9, wherein said address information correcting means corrects the address information based on a detection result of an address segment number included in the address information.

11. The optical disk apparatus of claim 9, further comprising land/groove judging means for judging whether a recording track on which said first and second address areas are positioned is the land or groove by comparing the address information reproduced from said first address area with the address information reproduced from said second address area.

12. A using method of an optical disk apparatus for recording/reproducing data into/from an optical disk, (A) said optical disk apparatus comprising:
   laser emitting means for emitting a laser beam onto said optical disk;
   clock detecting means for detecting a clock signal by obtaining a tangential push-pull signal which is a signal of a difference in light quantity of reflected light of the laser beam emitted onto a clock area of said optical disk in a tangential line direction thereof;
   address reproducing means for reproducing address information by obtaining a radial push-pull signal which is a signal of a difference in light quantity of reflected light of the laser beam emitted onto an address area of said optical disk in a radius direction thereof;
   recording/reproducing means for recording/reproducing data into/from said optical disk based on the address information reproduced by said address reproducing means; and clock generating means for generating a recording clock and a reproducing clock of said data based on said tangential push-pull signal, (B) said optical disk having concentrical or spiral lands and grooves both used as recording tracks each divided into sectors used as units in writing/reading out data, each of said sectors provided in each of said recording tracks including:

a first address area for recording address information at one of two walls at boundaries between each recording track and adjacent recording tracks alone by means of wobbling;

a second address area for recording the address information at the other wall on a non-wobbled side in said first address area alone by means of wobbling;

a data area sandwiched by non-wobbled portions of said two walls; and a plurality of clock areas provided discretely along a tangential line direction of the recording tracks, each sandwiched by two areas at a head and a bottom, respectively, each and said two areas having different light reflection, each sector being divided into a plurality of segments along the tangential line direction, said first address area being placed in a first segment at a head of each sector, said second address area being placed in a second segment adjacent to said first segment, and said plurality of clock areas being placed in said plurality of segments, respectively.

13. An optical disk apparatus for recording/reproducing data into/from an optical disk including:

concentrical or spiral lands and grooves both used as recording tracks each divided into sectors used as units in writing/reading out data;

a first address area for recording address information at one of two walls forming the grooves alone by means of wobbling;

a second address area for recording the address information at the other wall on a non-wobbled side in said first address area alone by means of wobbling;

a data area sandwiched by two non-wobbled walls;

a plurality of clock areas, provided discretely along a tangential line direction of the recording tracks, each appended with head and bottom portions, each and said head and bottom portions having different light reflection, each sector being divided into a plurality of segments, said first address area being placed in a first segment, said second address area being placed in a second segment, and said plurality of clock areas being placed in said plurality of segments, respectively, said apparatus comprising:

clock detecting means for detecting a clock signal by obtaining a tangential push-pull signal which is a signal of a difference in light quantity of reflected light of a laser beam emitted onto each of said plurality of clock areas in the tangential line direction;

address reproducing means for reproducing the address information by obtaining a radial push-pull signal which is a signal of a difference in light quantity of reflected light of a laser beam emitted onto said first address area and said second address area along a radius direction of the disk;

recording/reproducing means for recording/reproducing data based on the address information reproduced by said address reproducing means; and clock generating means for generating a recording clock and a reproducing clock of said data based on said tangential push-pull signal.

* * * * *